United States Patent [19]
Smith

[11] Patent Number: 6,040,003
[45] Date of Patent: *Mar. 21, 2000

[54] METHOD AND APPARATUS FOR LUBRICATING CONTINUOUS FIBER STRAND WINDING APPARATUS

[75] Inventor: Roy E. Smith, Columbus, Ohio

[73] Assignee: Owens Corning Fiberglas Technology, Inc., Summit, Ill.

[*] Notice: This patent is subject to a terminal disclaimer.

[21] Appl. No.: 09/035,714

[22] Filed: Mar. 5, 1998

Related U.S. Application Data

[63] Continuation of application No. 08/683,014, Jul. 16, 1996, Pat. No. 5,756,149.

[51] Int. Cl.[7] ............................................. B05D 3/12
[52] U.S. Cl. .................... 427/177; 242/477; 242/483.5; 28/178
[58] Field of Search .............................. 28/178; 242/477, 242/483.5; 427/177

[56] References Cited

U.S. PATENT DOCUMENTS

| | | |
|---|---|---|
| 1,591,020 | 7/1926 | Damon . |
| 2,922,491 | 1/1960 | Macks . |
| 2,935,363 | 5/1960 | Schindel . |
| 2,986,433 | 5/1961 | Herrmann . |
| 3,109,602 | 11/1963 | Smith . |
| 3,284,179 | 11/1966 | Eilerman . |
| 3,292,871 | 12/1966 | Smith et al. . |
| 3,334,980 | 8/1967 | Smith . |
| 3,367,587 | 2/1968 | Klink et al. . |
| 3,371,877 | 3/1968 | Klink et al. . |
| 3,408,012 | 10/1968 | Smith et al. . |
| 3,498,550 | 3/1970 | Klink et al. . |
| 3,523,650 | 8/1970 | Klink et al. . |
| 3,612,631 | 10/1971 | O'Connor . |
| 3,664,596 | 5/1972 | Lenk . |
| 3,717,331 | 2/1973 | Simons . |
| 3,819,122 | 6/1974 | Genson . |
| 3,838,827 | 10/1974 | Klink et al. . |
| 3,900,166 | 8/1975 | Sartori . |
| 3,968,939 | 7/1976 | Bense . |
| 3,998,404 | 12/1976 | Reese . |
| 4,045,195 | 8/1977 | Drummond . |
| 4,130,248 | 12/1978 | Hendrix et al. . |
| 4,167,252 | 9/1979 | Klink et al. . |
| 4,170,459 | 10/1979 | Myers . |
| 4,206,884 | 6/1980 | Myers . |
| 4,235,387 | 11/1980 | Nicoulaud . |
| 4,364,762 | 12/1982 | Sullivan et al. . |
| 4,383,653 | 5/1983 | Nakazawa et al. . |
| 4,415,126 | 11/1983 | Nakazawa et al. . |
| 4,465,241 | 8/1984 | Merritt . |
| 4,638,955 | 1/1987 | Schippers et al. . |
| 4,958,664 | 9/1990 | Oppl et al. . |
| 5,033,685 | 7/1991 | Busenhart et al. . |
| 5,756,149 | 5/1998 | Smith ...................................... 427/177 |

OTHER PUBLICATIONS

"Micro–Fog Lubricator", C.A. Norgren Co., 1988 (no month date).

*Primary Examiner*—Katherine A. Bareford
*Attorney, Agent, or Firm*—Inger H. Eckert

[57] ABSTRACT

A moving strand is provided and a size is applied to the strand. A collet is rotated to wind the strand and build a package. The strand is reciprocated with a strand reciprocator to lay the strand in a pattern on the package surface as the package rotates. The strand reciprocator is lubricated with a lubricant which is compatible with the size. There is also provided an apparatus for winding a fiber strand to build a cylindrical strand package having a radially outer surface. The apparatus includes a rotatable collet for receiving the strand to build a package. A strand reciprocator is mounted to guide the strand from edge to edge of the package and to lay the strand in a helical pattern on the package surface as the package rotates. A lubricator for atomizing a lubricant creates a fog of small airborne lubrication particles which are compatible with the size. A lubricant supply manifold is connected to the lubricator for transferring the small airborne particles to predetermined lubrication locations at the winder. These lubrication locations include the cam surface and the grooves provided thereon, the cam bearings and the roller bail bearings.

5 Claims, 4 Drawing Sheets

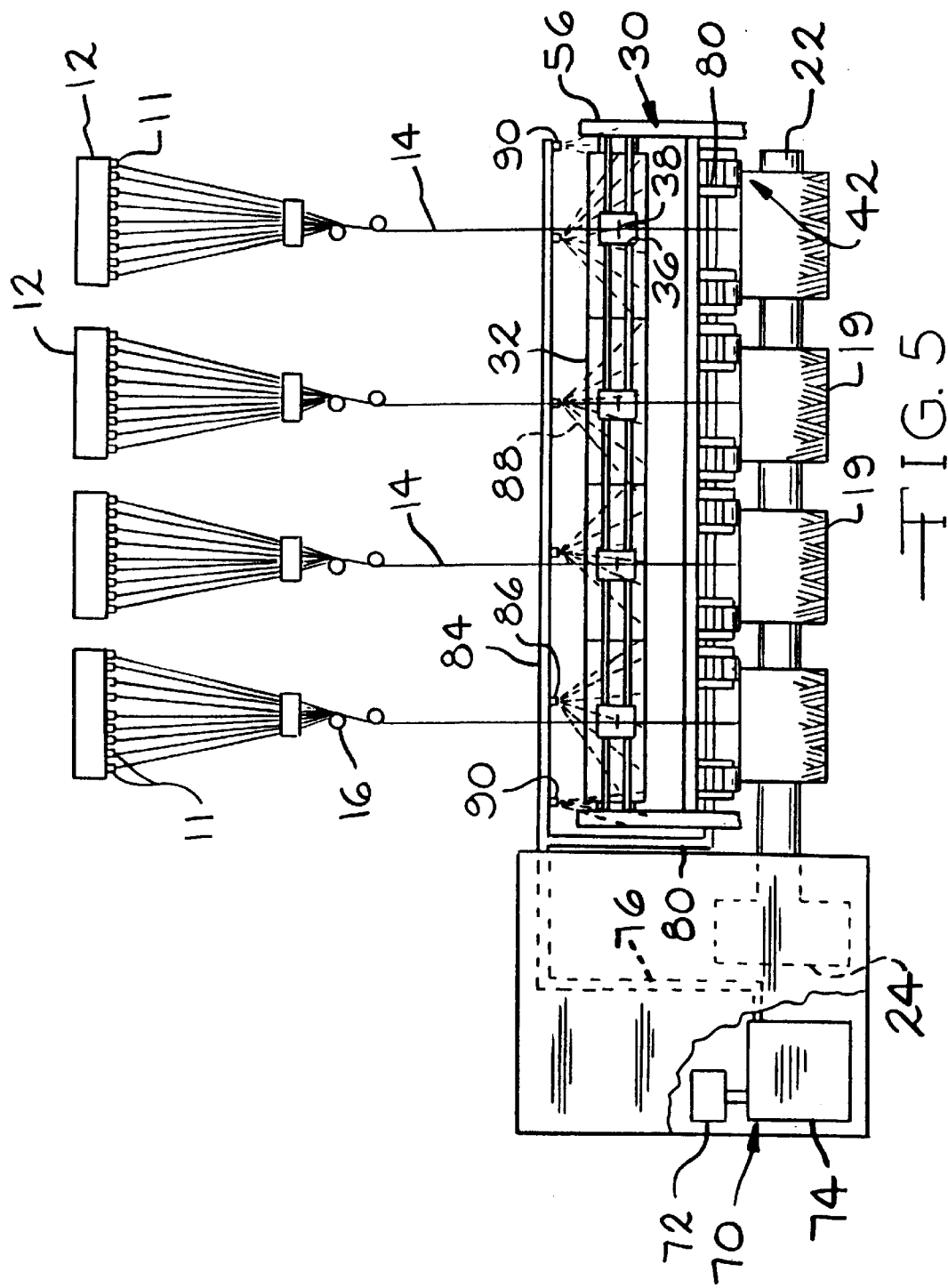

METHOD AND APPARATUS FOR LUBRICATING CONTINUOUS FIBER STRAND WINDING APPARATUS

CROSS NOTING TO RELATED APPLICATIONS

This is a continuation of application Ser. No. 08/683,014, filed Jul. 16, 1996, now U.S. Pat. No. 5,756,149.

TECHNICAL FIELD

This invention relates to the production of glass fibers, and in particular, to winding a glass fiber strand to form packages. More particularly, this invention relates to lubricating a glass fiber strand winding apparatus.

BACKGROUND OF THE INVENTION

Mineral fibers are used in a variety of products. The fibers can be used as reinforcements in products such as plastic matrices, reinforced paper and tape, and woven products. During the fiber forming and collecting process numerous fibers are bundled together as a stand. Several strands can be gathered together to form a roving used to reinforce a plastic matrix to provide structural support to products such as molded plastic products. The strands can also be woven to form a fabric, or can be collected in a random pattern as a fabric. The individual strands are formed from a collection of glass fibers, or can be comprised of fibers of other materials such as other mineral materials or organic polymer materials. A protective coating, or size, is applied to the fibers which allows them to move past each other without breaking when the fibers are collected to form a single strand. The size also improves the bond between the strands and the plastic matrix. The size may also include bonding agents which allow the fibers to stick together, thereby forming an integral strand.

Typically, continuous fibers, such as glass fibers, are mechanically pulled from a feeder of molten glass. The feeder has a bottom plate, or bushing, which has anywhere from 200 to 10,000 orifices. In the forming process, the strand is wound around a rotating drum, or collet, to form, or build, a package. The completed package consists of a single long strand. It is preferable that the package be wound in a manner which enables the strand to be easily unwound, or paid out. It has been found that a winding pattern consisting of a series of helical courses laid on the collet builds a package which can easily be paid out. Such a helical pattern prevents adjacent loops or wraps of strand from fusing together should the strand be still wet from the application of the size material. The helical courses are wound around the collet as the package begins to build. Successive courses are laid on the outer surface of the package, continually increasing the package diameter, until the winding is completed and the package is removed from the collet.

A strand reciprocator guides the strand longitudinally back and forth across the outer surface of the package to lay each successive course. A known strand reciprocator is the spiral wire type strand oscillator. It consists of a rotating shaft containing two outboard wires approximating a spiral configuration. The spiral wires strike the advancing strand and direct it back and forth along the outer surface of the package. The shaft is also moved longitudinally so that the rotating spiral wires are traversed across the package surface to lay the strand on the package surface. While building the package, the spiral wire strand oscillator does not contact the package surface. Although the spiral wire strand oscillator produces a package that can be easily paid out, the package does not have square edges.

A known strand reciprocator which produces square edged, cylindrical packages includes a cam having a helical groove, a cam follower which is disposed within the groove and a strand guide attached to the cam follower. As the cam is rotated, the cam follower and strand guide move the strand longitudinally back and forth across the outer surface of the rotating package to lay each successive course. A rotatable cylindrical member, or roller bail, contacts the outer surface of the package as it is being built to hold the strand laid in the latest course in place at the package edges as the strand guide changes direction. The roller bail is mounted for rotation, and bearings are used to reduce the friction between the roller bail and the mounting surface. The collet and package are rotating at high speeds during winding. The contact between the roller bail and the rotating package surface causes the roller bail to rotate, and the speed of the roller bail surface is generally equal to the high rotational speed of the package surface. The roller bail has a fixed diameter which is generally less than the diameter of the collet, and may be only 10% of the collet diameter. Therefore, the roller bail must rotate at higher revolutions per minute (RPMs) to keep the roller bail surface traveling at the same speed as the speed of the package surface. To operate effectively throughout the preferred range of package sizes and preferred collet speeds during winding the roller bail may have to rotate at 70,000 RPMs or higher.

The rotating rollers of the roller bails contact the strand as it is laid on the package surface. If the speed of the roller bail surface does not match the speed of the package surface, the roller bail will apply abrasive forces against the strand, and this can break some of the fibers in the strand. Bearings are provided between the roller bail mounts and the rotating roller bail to reduce friction and allow the roller bail to rotate at high RPMs. Typical grease lubricated bearings which have been used in the past have been found not to reduce the friction enough to allow the roller bails to operate at such high RPMs without causing abrasive forces against the strand which can break strand fibers. The strand reciprocator has other moving parts in addition to the roller bails with surfaces which need lubrication. The rotating cam has bearings which use lubrication. The cam follower needs lubrication while it moves along the groove on the cam surface.

A known method of lubricating moving parts, including bearings, uses a lubricating fogger to atomize lubrication material to form small, airborne particles of the lubrication material. The lubrication particles are deposited on the bearing surfaces to provide adequate lubrication for operation. The lubrication fogger uses known lubrication materials, such as oil, and other petroleum-based lubricants.

It has been found that using petroleum-based lubricants on the moving parts or surfaces of strand winders is inadequate. Invariably, some of the petroleum-based lubricant makes its way onto the strand being wound by the winder. Unfortunately, the petroleum-based lubricants are not compatible with the size, and they contaminate the strands and interfere with products the strands are used in. For example, fabrics woven from the strands are corinized to burn the size off the fabrics to allow a different coating to be applied. Petroleum-based lubricants on the strands carbonize and discolor the fabrics during corinizing and may even cause holes to be burned in the fabric. Also, contamination of strands used as reinforcing products interferes with the bonding between the strands and the plastic matrices. The problem of contamination of the strand is made worse where a fogger-type lubrication system is used.

It would be desirable to lubricate the moving parts of a strand winder and not contaminate the strands with a lubricant that interferes with the products in which the strands are used. Also, it is desirable to use a lubricant with the lubricating fogger which is compatible with the size and which will not interfere with the products that the strands are used in.

DISCLOSURE OF THE INVENTION

According to this invention there is provided a method for winding a mineral fiber strand to build a package. A moving strand is provided and a size is applied to the strand. A collet is rotated to wind the strand and build a package. The strand is reciprocated with a strand reciprocator to lay the strand in a pattern on the package surface as the package rotates. The strand reciprocator is lubricated with a lubricant which is compatible with the size. The lubricant may be a constituent of the size. Since the lubricant is compatible with the size, it will not interfere with any products made from the strand.

The strand reciprocator includes a cam, a cam follower, and a reciprocating strand guide mounted on the cam follower to be reciprocated by rotation of the cam. Roller bails are included to hold the strand at the edges of the package surface to build packages with square edges. Roller bail bearings reduce the friction of the rotating roller bails. The lubricant is atomized to create a fog of small airborne lubrication particles. The airborne lubrication particles are transferred through a manifold to predetermined application locations at the cam, the cam follower and the roller bail bearings. The fog is released from the manifold at the predetermined application locations to lubricate the cam, the cam follower, and the roller bail bearings.

According to this invention there is also provided an apparatus for winding a fiber strand to build a cylindrical strand package having a radially outer surface. The apparatus includes a rotatable collet for receiving the strand to build a package. A strand reciprocator is mounted to guide the strand from edge to edge of the package and to lay the strand in a helical pattern on the package surface as the package rotates. A lubrication fogger atomizes a lubricant to creates a fog of small airborne lubrication particles of which are compatible with the size. A lubricant supply manifold is connected to the lubricator for transferring the small airborne particles to predetermined lubrication locations at the winder. These lubrication locations include the cam surface and the grooves provided thereon, the cam bearings and the roller bail bearings.

BRIEF DESCRIPTION OF DRAWINGS

FIG. 5 is a diagrammatic view of an alternate embodiment of the invention showing the building of multiple packages on a single collet.

DESCRIPTION OF THE PREFERRED EMBODIMENTS

Figure 1:
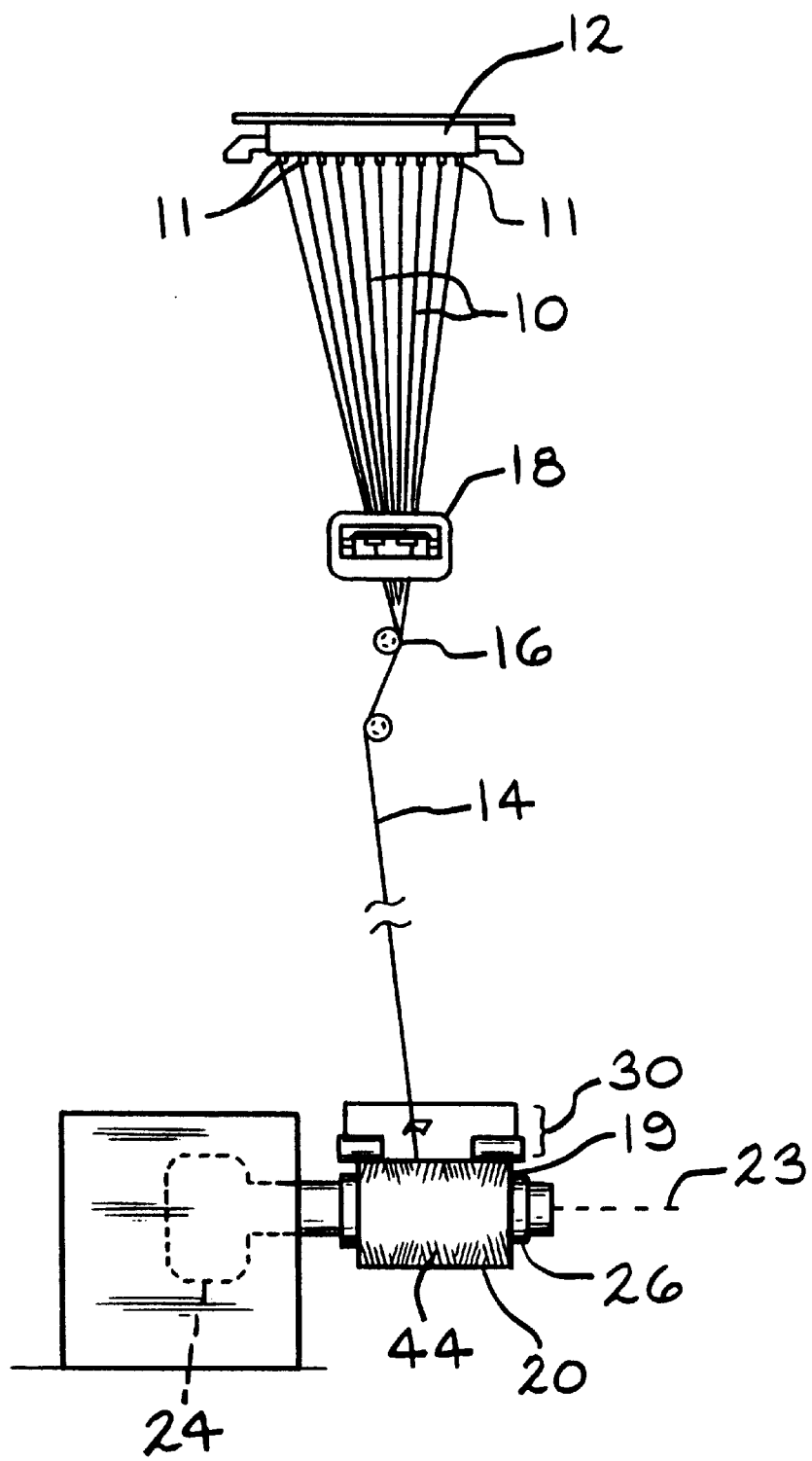
FIG. 1 is a schematic view in elevation of apparatus for forming, collecting and winding fiber strands according to the principles of the invention.
Figure 2:
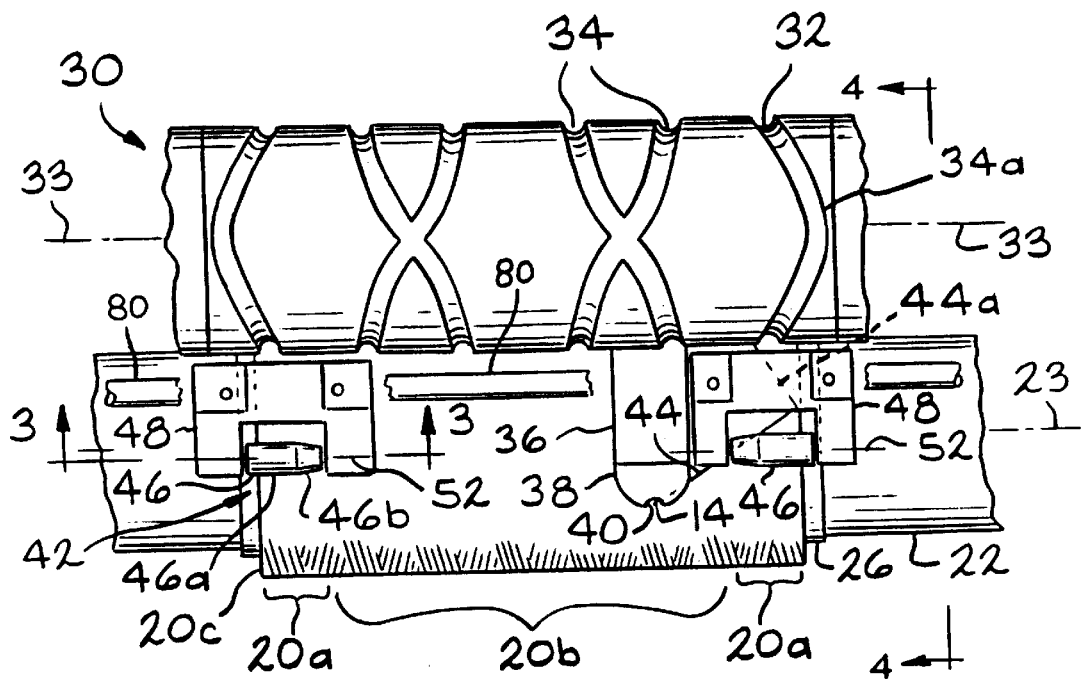
FIG. 2 is an enlarged, schematic view in elevation of the strand reciprocator shown in FIG. 1.

FIGS. 1 and 2 show apparatus for forming, collecting, and winding strands in which fibers 10 are drawn from a plurality of orifices 11 in a bushing 12 and gathered into a strand 14 by means of a gathering member 16. A size suitable for coating the fibers can be applied to the fibers by any suitable means, such as size applicator 18. The strand is wound around a rotating collet 22 to build a cylindrical package 19. The package, formed from a single, long strand, has a radially outer surface 20 with edge portions 20a and a central portion 20b between them. The edge portions 20a form generally right angles with the package ends 20c. The outer surface of the cylindrical package is preferably between about 10 cm to about 40 cm long, but may be longer or shorter depending on the application. The collet is adapted to be rotated about an axis of rotation 23 by any suitable means such as a motor 24. Any suitable package core material such as a cardboard tube 26 can be disposed on the collet to receive the strand package.

Referring now to FIG. 2, a strand reciprocator 30 guides the strand 14 laterally back and forth across the package surface 20 to lay the strand in courses 44 on the package surface. The strand reciprocator includes a cylindrical cam 32 having a helical groove 34. The cam is mounted for rotation and preferably made of a hard material, such as stainless steel, but any suitable material can be used. The strand reciprocator further includes a cam follower 36 disposed in the groove 34. The cam follower extends outwardly from the cam and a strand guide 38 is attached to the end. The cam follower is preferably made of a plastic or nylon material, but any suitable material can be used. A notch 40 is formed in the strand guide to hold the strand 14. Rotation of the cam causes the cam follower to follow the helical groove, thereby causing the strand guide to move laterally across the package surface.

Figure 3:
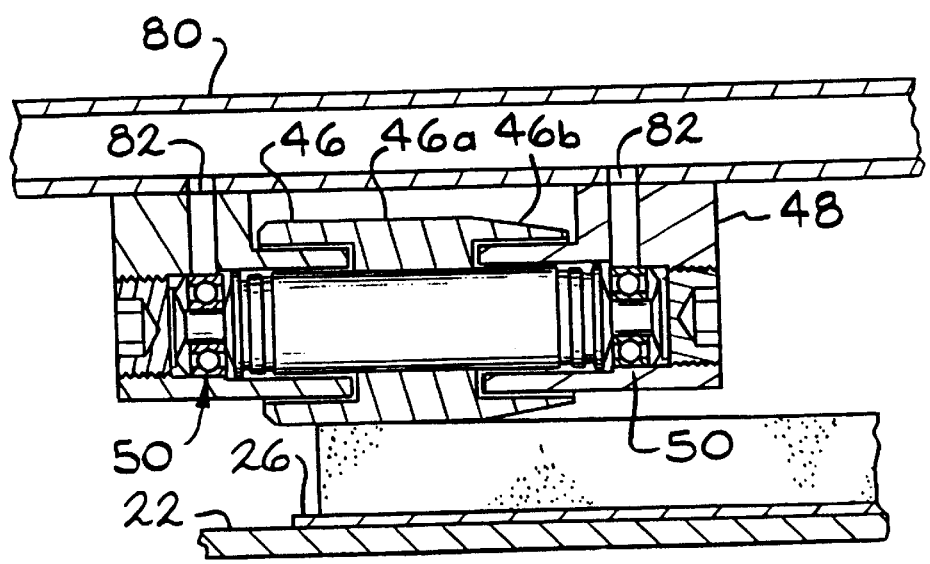
FIG. 3 is a schematic sectional view in elevation of the apparatus of FIG. 2, taken along line 3—3.

Referring now to FIGS. 2 and 3, the strand reciprocator further includes a roller bail assembly 42 for holding the strand courses 44 in place at the edge portions 20a of the package surface 20 as the strand guide 38 changes direction. The roller bail assembly includes a pair of spaced apart, or split rollers 46. The rollers have generally cylindrical edge ends 46a and tapered inner ends 46b. The cylindrical edge ends contact the package surface at the edges 20a. The tapered inner ends extend from the edge ends towards the central portion of the package surface 20b.

The rollers do not contact the surface of the package at the central portion of the package 20b. Each of the rollers 46 is independently mounted by mounts 48.

One or more bearings 50 are located between the roller bails and the mounts to allow the roller bails to rotate freely by reducing friction. The bearings are preferably open, ball bearing type bearings. Although the roller bails are shown as mounted at both the edge ends and the inner ends, the roller bails may be cantilevered, being mounted at only one end. Each roller is made from a hard material, such as stainless steel, but any suitable material may be used. The rollers preferably weigh approximately 50 grams each, but may be heavier or lighter depending on their size and the application. They are preferably hollow to minimize weight and inertia, but may be solid. Each roller is preferably about 2 cm long, but they may be longer or shorter depending on the application.

The split roller bails are preferably coaxial, contacting the package surface along a portion of a line 52 which is generally parallel to the package axis of rotation 23, although, any suitable orientation of the roller bails may be used. Using 2 cm long roller bails, the length of contact between the roller bails and the typical package surface will be approximately 10% to 50% of the length of the outer surface of the package. A longer or shorter length of contact between the roller bails and the package surface may be used depending on the application.

Figure 4:
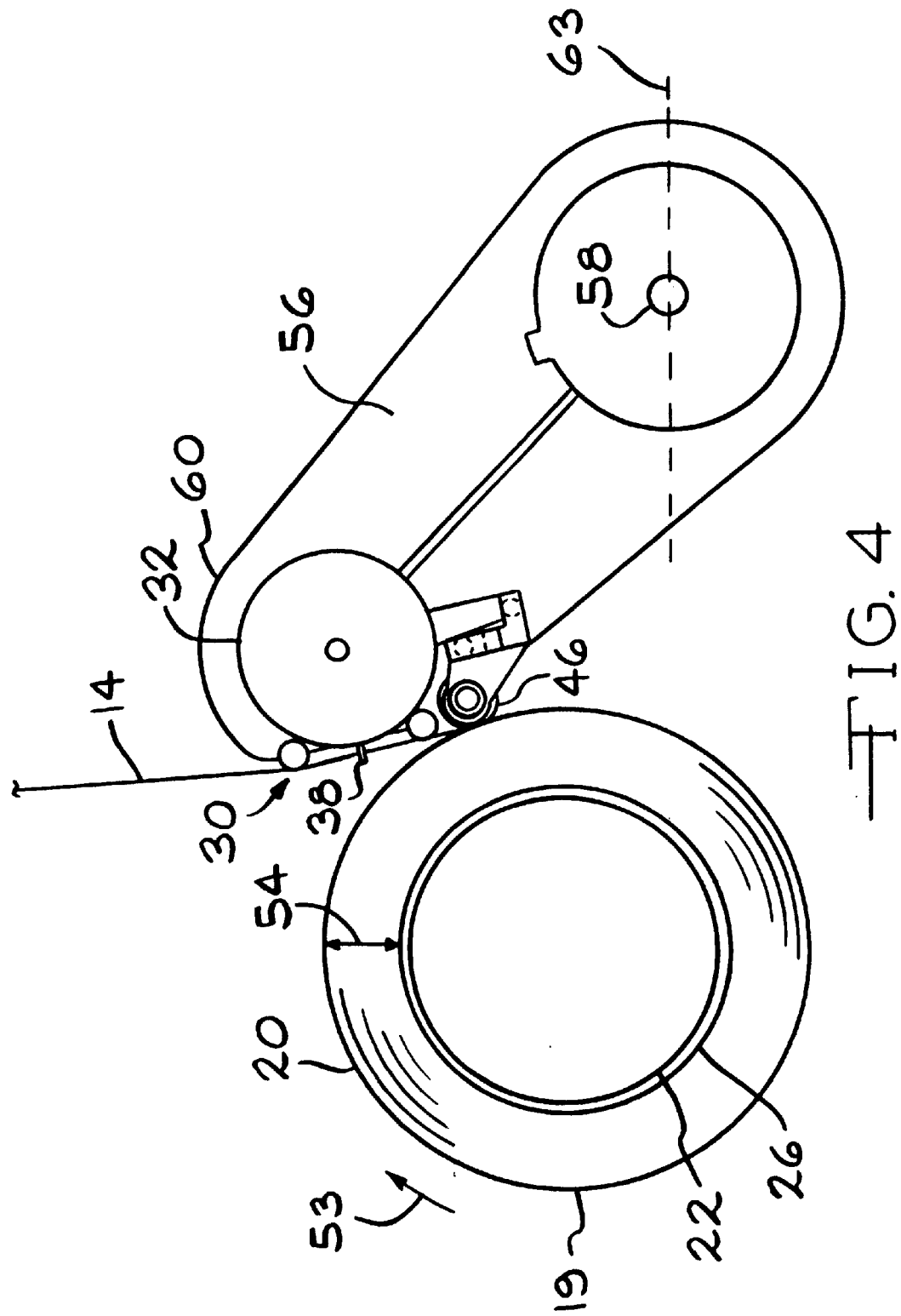
FIG. 4 is an end view in elevation of a portion the roller bail assembly of FIG. 1.

The package rotates during winding as shown by line 53 in FIG. 4. As the package builds, the radius 54 increases. To accommodate the increasing package radius, the strand reciprocator 30 is mounted on an arm 56. To accommodate the increasing package radius, the arm moves away from the collet along line 63 to keep the proper contact between the surface of the rollers and the package surface, and to prevent the strand courses 44a from pulling away from the edge portions 20b of the package surface.

Several packages can be built simultaneously on the collet, as shown in FIG. 5. Each package is built by drawing separate strands 14 from separate bushing sections. The strands are wound around a single collet 22 to form packages 19. A separate strand reciprocator, including cam 32, cam follower 36, strand guide 38 and roller bail assembly 42, is used to build each package. The packages are spaced apart along the collet and the strand reciprocators are spaced along the arm 56 in a similar manner so as to be aligned with the packages.

A lubricating fogger assembly 70 is located near the strand winding apparatus. The lubricating fogger assembly includes a reservoir 72 which holds a supply of lubricant, preferably in the liquid state. The reservoir is attached to the lubricating fogger 74 which atomizes the lubrication to create a fog of small airborne particles of the lubricant. Any fogger suitable for atomizing liquid lubricant to fine particles can be used. An acceptable fogger is a micro-fog lubricator, made by C.A.. Norgren Co., of Littleton, Colo. Particle sizes are within the range of from about 1 micron to about 10 microns, and are typically about 3 to 4 microns in diameter.

The fog of airborne lubrication particles is transferred to lubrication locations at the winding apparatus via conduits. A main conduit 76 is connected to the fogger. A roller bail conduit 80 is connected to the main conduit and carries the fog of airborne lubrication particles to the roller bail bearings. As shown in FIG. 3, the roller bail mounts 48 are attached to the roller bail conduit 80 and the fog of airborne lubrication particles is transferred to the roller bail bearings 50 via bearing conduits 82 inside the mounts. Alternatively, where the roller bails are not mounted on the roller bearing conduit, the fog of airborne lubrication particles can be transferred to the roller bail bearing via external connecting conduits, not shown, located between the roller bail conduit and the roller bail bearings.

A cam conduit 84 branches from the main conduit and runs along the cam 32. The fog of airborne lubrication particles is released from orifices (not shown) in tubes 86 projecting from the cam conduit above the lubrication locations at the cam. The orifices preferably have a diameter in the range of about 0.02 cm to about 0.04 cm. After traveling through the orifices, the fog of airborne lubrication particles is reconstituted into larger particles which are too large to stay airborne, and which fall onto the cam 32 and cam groove 34 to lubricate the cam follower 36 as it moves in the cam groove. Cam bearing tubes 90 extend from the cam conduit and release the fog of airborne lubrication particles from orifices (not shown). The orifices preferably have a diameter in the range of about 0.02 cm to about 0.04 cm. After traveling through the orifices, the fog of airborne lubrication particles is reconstituted into larger particles which are no longer airborne and which fall onto the cam bearings (not shown) to lubricate them. Alternatively, the fog can be transported directly to the cam bearings via lubrication conduits similar to the roller bail bearings mentioned above.

The lubrication which is atomized is compatible with the size. Being compatible with the size means that the lubricant will not interfere with any products which the fiber strands are used to make. Petroleum-based lubricants, for example are generally not compatible with typical sizes used on glass fibers. They contaminate the strands and interfere with products made from the strands, such as fabrics woven from the strands. When the fabrics are corinized to burn the size off the organic material to allow a different coating to be applied, petroleum-based lubricants on the strands carbonize and discolor the fabrics, and may even cause holes to be burned in the fabric. Also, contamination of strands used as reinforcing products interferes with the bonding between the strands and the plastic matrices.

Typically, glass fiber sizes comprise film formers, such as a polymer, silanes for coupling the glass fiber to the resin matrix, and one or more lubricants. The lubricant to be used with the fogger of the invention is preferably a constituent of the size. For example, butoxyethylstearate (BES) is an organic, agriculturally based lubricant which can be a constituent of the size and can be used as the lubricant to be atomized and applied to the moving parts of the winder according to this invention. Another lubricant that can be used is a bisimid which is a reaction product of stearic acid and tetraethylenepentamine. An additional lubricant which should also be useful is Emery 6760U an industrial lubricant which is a reaction product of polyethyleneimine polyamide salt and water, and is sold by Henkel Corporation of Ambler, Pa. It is to be understood that the lubricant may also be a material which is not already a constituent of the size, but is compatible with the size. The lubricant may be water soluble or at least self-emulsifying for easy clean up of the winding apparatus.

The winding apparatus operates as follows. The strand reciprocator 30 guides the strand 14 as it is laid on the outer surface of the package. The strand is held by notch 40 in the strand guide 38 and wound around the rotating collet 22 or a package core 26 disposed about the collet. The cam 32 is oriented near the package and rotates about an axis 33 generally parallel to the package axis of rotation 23. The cam follower is disposed within the cam groove 34, but is prevented from rotating with the cam. As the cam rotates, the cam follower is moved laterally by the helical groove in a direction generally parallel to the package axis of rotation 23. The helical groove is continuous, having curved ends 34a that cause the cam follower to move to the end of the package and then reverse direction. The strand guide is attached to the cam follower and it traverses the outer surface of the package, reciprocating back and forth from end to end. The strand guide does not contact the surface of the package.

The helical winding pattern of each strand course 44 is formed by reciprocating the strand across the package surface while rotating the package. As the strand guide approaches the edge of the package 20a, the strand is laid on the package surface under the roller tapered inner edge 20b. The strand guide continues to move towards the edge of the package and the strand course, shown in phantom at 44a in FIG. 2, moves between the package surface and the cylindrical edge end of the roller which is in contact with the package surface. When the cam follower travels through the curved end 34a of the groove 34, the strand guide 38 changes direction and moves away from the package edge and towards the central portion of the package 20b. The contact between the roller bails and the package surface holds the strand course 44a in place at the edge of the package surface 20a, when the strand guide changes direction. By preventing the strand courses 44a from pulling away from the package edges as the strand guide moves back towards the center of the package 20b, a cylindrical package having square edges is built.

The rolling contact between the rollers and the rotating package surface causes the rollers to rotate. The speed of the roller surface is generally equal to the speed of the package surface and the speed of the strand. The roller bails may be traveling at speeds as high as 70,000 RPMs or higher to keep the roller bail surfaces traveling at the same speed as the package surface. The lubricated bearings provide a low roller resistance and allow the roller bails to rotate at such high speeds. When the speeds are equal, there is little abrasive force between the strand and the roller bails.

In the multiple package operation, the fiber forming process is controlled to keep all the packages building, and the package radii increasing, at a similar rate. However, differences in package radii occur during winding because the diameters of the strands are not always equal from package to package. Fluctuations in bushing temperatures, and inconsistencies in material properties can change the diameter of the fibers, and thus the strands, from package to package. Therefore, one package radius may temporarily vary from the others until process corrections are made. Corrections can be made, for example, by using current injection to regulate the temperature of the bushings to control strand diameter. Differences in the radii of the packages can cause the roller bails to occasionally leave the surface of a package. When a roller loses contact with the package surface, the rotational speed of the roller begins to decrease. As the surface of the roller comes back into contact with the package surface the rotational speed of the roller increases until the surface of the roller is traveling at the same speed as the surface of the package. Due to the low rolling resistance of the fogger lubricated bearings 50, the roller bails spin back up to speed quickly. They skid less and produce less abrasive forces against the strands and therefore are less likely to break any of the individual fibers in the strands. In addition, when the collet is accelerating during startup, the split roller bails produce less abrasive forces against the strand while they are accelerating and, therefore, break few fibers.

The principle and mode of operation of this invention have been described in its preferred embodiment. However, it should be noted that this invention may be practiced otherwise than as specifically illustrated and described without departing from its scope.

INDUSTRIAL APPLICABILITY

The invention can be useful in the production of fiber strand products for use as a reinforcement in molded resinous articles.

I claim:

1. A method for winding a mineral fiber strand to build a package comprising the steps of:
   providing a moving strand;
   applying a size to the strand;
   attaching the strand to a collet;
   rotating the collet to wind the strand and build a package of the strand;
   reciprocating the strand with a strand reciprocator to lay the strand in a pattern on a package surface as the package rotates during building;
   generating a fog of airborne lubrication particles from a lubricant; and
   lubricating the strand reciprocator by transferring a portion of the fog of airborne lubrication particles to the strand reciprocator, wherein the lubricant is one of a self-emulsifying lubricant, an organic, agriculturally based lubricant, a bisimid, and a reaction product of polyethyleneimine polyamide salt and water.

2. A method for winding a mineral fiber strand to build a package comprising:
   providing a moving strand;
   applying a size to the strand;
   attaching the strand to a collet;
   rotating the collet to wind the strand and build a package of the strand;
   reciprocating the strand with a strand reciprocator to lay the strand in a pattern on a package surface as the package rotates during building, wherein the strand reciprocator includes a cam and a reciprocating strand guide mounted to be reciprocated by rotation of the cam;
   generating a fog of airborne lubrication particles by atomizing a lubricant;
   transferring a portion of the fog of airborne lubrication particles through a cam conduit to an application location at the strand reciprocator; and
   releasing the lubricating fog from the cam conduit at the application locations to lubricate the strand reciprocator.

3. A method for winding a mineral fiber strand to build a package comprising the steps of:
   providing a moving strand;
   applying a size to the strand;
   attaching the strand to a collet;
   rotating the collet to wind the strand and build a package of the strand;
   reciprocating the strand with a strand reciprocator to lay the strand in a pattern on a package surface as the package rotates during building;
   generating a fog of airborne lubricant particles from a lubricant, wherein the lubricant is one or more lubricants of the group consisting essentially of butoxyethylstearate, a reaction product of stearic acid and tetraethylenepentamine, and a reaction product of polyethyleneimine polyamide salt and water; and
   lubricating the strand reciprocator by transferring a portion of the fog of airborne lubrication particles to the strand reciprocator.

4. The method defined in claim 3, wherein the lubricant is a constituent of the size.

5. The method defined in claim 3, wherein the lubricant is butoxyethylstearate.

* * * * *